United States Patent [19]

Buhler et al.

[11] Patent Number: 4,936,200

[45] Date of Patent: Jun. 26, 1990

[54] PREPARATION OF INDIVIDUAL ARTICLES FROM PARTICULATE MATERIAL

[75] Inventors: Marcel Buhler, Tolochenaz; Jean-Michel Martin, Valeyres/Rances, both of Switzerland

[73] Assignee: Nestec S.A., Vevey, Switzerland

[21] Appl. No.: 203,267

[22] Filed: Jun. 7, 1988

[30] Foreign Application Priority Data

Jun. 25, 1987 [CH] Switzerland ........................ 2392/87

[51] Int. Cl.[5] ................................................ A21C 9/00

[52] U.S. Cl. ..................................... 99/353; 99/450.2; 99/450.7; 425/259; 425/261; 425/434; 425/441; 425/444; 426/503; 426/516

[58] Field of Search ................. 99/353, 352, 426, 427, 99/428, 430, 441, 494, 450.1, 450.2, 450.7; 426/502, 503, 512, 516, 285; 425/256, 259, 261, 425, 426, 428, 430, 431, 434, 441, 444, 447, 436.1, 133.1

[56] References Cited

U.S. PATENT DOCUMENTS

| | | | |
|---|---|---|---|
| 810,193 | 1/1906 | Daum | 425/261 |
| 1,108,461 | 8/1914 | Michitsch | 99/450.2 |
| 1,706,874 | 3/1929 | DeJourno . | |
| 2,177,607 | 10/1939 | Brown et al. . | |
| 3,257,685 | 6/1966 | Butow et al. | 425/261 |
| 3,381,632 | 5/1968 | Pontecorvo | 99/353 X |
| 3,722,398 | 3/1973 | Freye et al. . | |
| 4,096,791 | 6/1978 | Weiss et al. | 99/353 |
| 4,241,649 | 12/1980 | Nelson et al. | 99/450.7 |
| 4,317,649 | 3/1982 | Boellmann | 425/261 |
| 4,348,166 | 9/1982 | Fowler | 99/353 |
| 4,528,900 | 7/1985 | Simelunas | 425/133.1 |
| 4,535,687 | 8/1985 | Antpohler | 99/353 X |
| 4,613,294 | 9/1986 | Rose et al. | 425/259 X |

FOREIGN PATENT DOCUMENTS

| | | |
|---|---|---|
| 313674 | 7/1919 | Fed. Rep. of Germany . |
| 824174 | 7/1949 | Fed. Rep. of Germany . |
| 475406 | 11/1914 | France . |
| 993925 | 5/1951 | France . |
| 39949 | 1/1937 | Netherlands . |
| 1302188 | 8/1969 | United Kingdom . |

*Primary Examiner*—Timothy F. Simone
*Attorney, Agent, or Firm*—Vogt & O'Donnell

[57] ABSTRACT

An endless conveyor transporting a plurality of juxtaposed shaping plates containing apertures therethrough is positioned such that a lower horizontal run of the shaping plates is positioned above and in alignment with a portion of an upper horizontal run of a belt conveyor and such that a lower surface of the plates abut the upper run of the belt conveyor for forming, by reason of the plate apertures and belt conveyor surface, article shaping cells. Means are provided for filling the cells with material to be formed into individual articles. The plates containing material in the cells are transported to a movable ejector unit having pistons which correspond in number, arrangement and shape with the number, arrangement and shape of the apertures of the plates. Upon engagement of a plate with the ejector unit, the plate and ejector unit move downstream together while the pistons of the ejector unit descend and tamp material in the apertures, and as the plates, which are adapted to ascend from the belt conveyor, ascend, the pistons maintain the material on the belt conveyor and eject it from the apertures. The ejector unit is disengaged from the plates and returns to its original position.

5 Claims, 5 Drawing Sheets

PREPARATION OF INDIVIDUAL ARTICLES FROM PARTICULATE MATERIAL

BACKGROUND OF THE INVENTION

This invention relates to an apparatus for shaping individual articles consisting of particles agglomerated with a binder.

An apparatus for continuously moulding a granular, tacky mass is already known, comprising an endless shaping belt formed by juxtaposed plates each drilled with a row of holes into which the mass is introduced through a bottomless distributing box in direct contact with the belt. The mass is kept in the holes by an apron on which the belt slides. The mass is then compressed in the holes or cells by a row of pistons. The articles (biscuits) thus moulded are ejected from the holes by other pistons downstream of the platform and drop onto a transverse conveyor belt which removes them from the apparatus. An apparatus of this type is suitable for the moulding and handling of relatively compact and solid articles which, in particular, withstand the drop from the moulding belt onto the conveyor belt.

SUMMARY OF THE INVENTION

The object of the present invention is to provide an apparatus which is suitable for the moulding of relatively fragile articles consisting of relatively light particles agglomerated with a binder in a relatively loose or airy manner.

The apparatus comprises an endless shaping belt with juxtaposed apertured plates, an endless conveyor belt positioned beneath part of the shaping belt for forming cells with the apertures in the plates, means for feeding the cells with particulate product to be shaped and an ejector comprising pistons adapted to the apertures. The shaping plates ascend while the pistons of the ejector hold the shaped individual articles on the conveyor belt. The ejector then disengages and the articles are removed from the apparatus without ever having left the belt.

To this end, the apparatus according to the invention is characterized by the fact that the feed means and a tamping and ejection unit are provided above a flat lower part of a loop formed by the endless shaping belt, an endless conveyor belt positioned beneath and aligned with said lower flat part of the shaping belt, said apertured plates are connected to drive chains by drive supports sliding on vertical drive shafts fixed to the chains, vertical drive rollers are provided on transverse axles integral with said drive supports, said tamping and ejection unit comprises said ejector, a vertical and horizontal-return drive mechanism for the ejector and a vertical drive guide intended to cooperate with said vertical drive rollers, said ejector comprises vertical pistons adapted to the apertures of an entire plate and integral with a hood sliding on at least one vertically displaceable horizontal shaft and said hood additionally comprises a pivotal, horizontal-forward drive arm intended to cooperate with horizontal-forward drive fingers integral with said drive supports.

It has been found that, with this apparatus, it is possible without disintegration to shape highly fragile, agglomerated articles, particularly articles which are intended to be dried after shaping and for which the binding effect of said binder and the resistance to crushing or shearing of said particles are still very weak before drying. In particular, the apparatus according to the invention enables such articles to be directly shaped on the conveyor belt by which they are carried through a drying apparatus without the articles having to undergo the slightest impact or the least drop between shaping and drying.

DESCRIPTION OF PREFERRED EMBODIMENTS

In the apparatus according to the invention, the endless shaping belt preferably forms an oval loop having a lower flat part along which the apertured plates pass successively beneath the feed means, beneath an optional distributing and equalizing unit and then beneath and through the tamping and ejection unit. The oval loop mentioned preferably also has a flat upper part along which the apertured plates return to their starting position ahead of the feed means.

The endless conveyor belt positioned beneath the shaping belt preferably travels at the same speed and in the same direction as the shaping belt along the lower flat part of said loop. This endless conveyor belt extends beyond the downstream end of the lower flat part of said loop.

The apertured plates of the shaping belt may be made in various ways. For example, the apertures may have been drilled into a solid plate and may be cylindrical in shape. In that case, the pistons of the ejector adapted to the apertures are preferably also cylindrical in shape with a diameter slightly smaller than that of the apertures.

In one preferred embodiment, the apertured plates are made in the form of grids of the grating type. This embodiment makes it possible to provide apertures separated by thin vertical walls and having openings of various shapes and sizes. However, the preferred shape is the square opening which enables cubic individual articles to be shaped. In that case, the pistons of the ejector adapted to the apertures preferably also have a square horizontal section with an edge length slightly below that of the apertures.

The means for feeding the cells may be formed, for example, by an endless transverse conveyor belt which delivers a mass of particulate product to be formed into a hopper arranged above the shaping belt at the upstream end of the lower flat part of the loop.

The optional distributing and equalizing unit may comprise, for example, at least one distributing island followed by rotary brushes and/or smoothing discs arranged over the entire width of the shaping belt above the latter and downstream of the feed means. The smoothing discs are preferably arranged in two rows, the downstream row comprising one disc less than the upstream row.

The tamping and ejection unit is designed to be able to impart relative movements to the apertured plates and to the ejector so that the individual articles always remain on the apron throughout the tamping and ejection operations.

Thus, in a first phase, when a plate reaches a certain position downstream of the optional distributing and equalizing unit, the ejector, entrained in a horizontal forward movement by a finger integral with the support of the plate, descends and compresses the particulate product in the cells by partial penetration of the pistons into the cells.

In a second phase, the plate ascends under the effect of the vertical drive rollers which engage with the vertical drive guide, which is preferably made in the form of inclined planes situated on either side of the shaping belt. These rollers, which are mounted on transverse axles integral with the support of the plate, thus cause the support to slide vertically along said drive shafts fixed to the chains.

In a third phase, the ejector, which has hitherto remained in its lower position in which it keeps the individual articles on the apron/conveyor belt, in turn ascends, disengages from the plate and is returned to its starting or waiting position in which it will .be entrained by a finger integral with the support of the following plate. The individual articles thus released from the cells are carried out of the apparatus on the endless conveyor belt.

The vertical movements and the horizontal-return movement of the ejector are imparted by the vertical and horizontal-return drive mechanism. This mechanism may comprise, on the one hand, vertical drive means, such as a pneumatic piston motor for example, connected to the vertically displaceable horizontal shaft on which the hood of the ejector slides. The mechanism in question may comprise, on the other hand, horizontal drive means, such as a pneumatic piston motor for example, intended to return or push the ejector sliding on the horizontal shaft back into its waiting position.

During these various movements, the pivotal, horizontal-forward drive arm integral with the hood of the ejector is either in its engaged position in which it is able to cooperate with or be pushed by the horizontal-forward drive fingers integral with the supports of the plates, or in its disengaged position in which the ejector can be returned or pushed pack into its waiting position. The pivoting movements from one position to the other may be imparted to this arm by drive means such as a pneumatic motor for example.

These various movements may be controlled and synchronized, for example by pneumatic or electrical switches (depending on the type of drive means used) arranged at certain distances along the tamping and ejection unit and actuated by the movements of the plate supports and the ejector.

The apparatus according to the invention is described hereinafter with reference to the accompanying drawings,

DETAILED DESCRIPTION OF THE DRAWINGS

Figure 1:
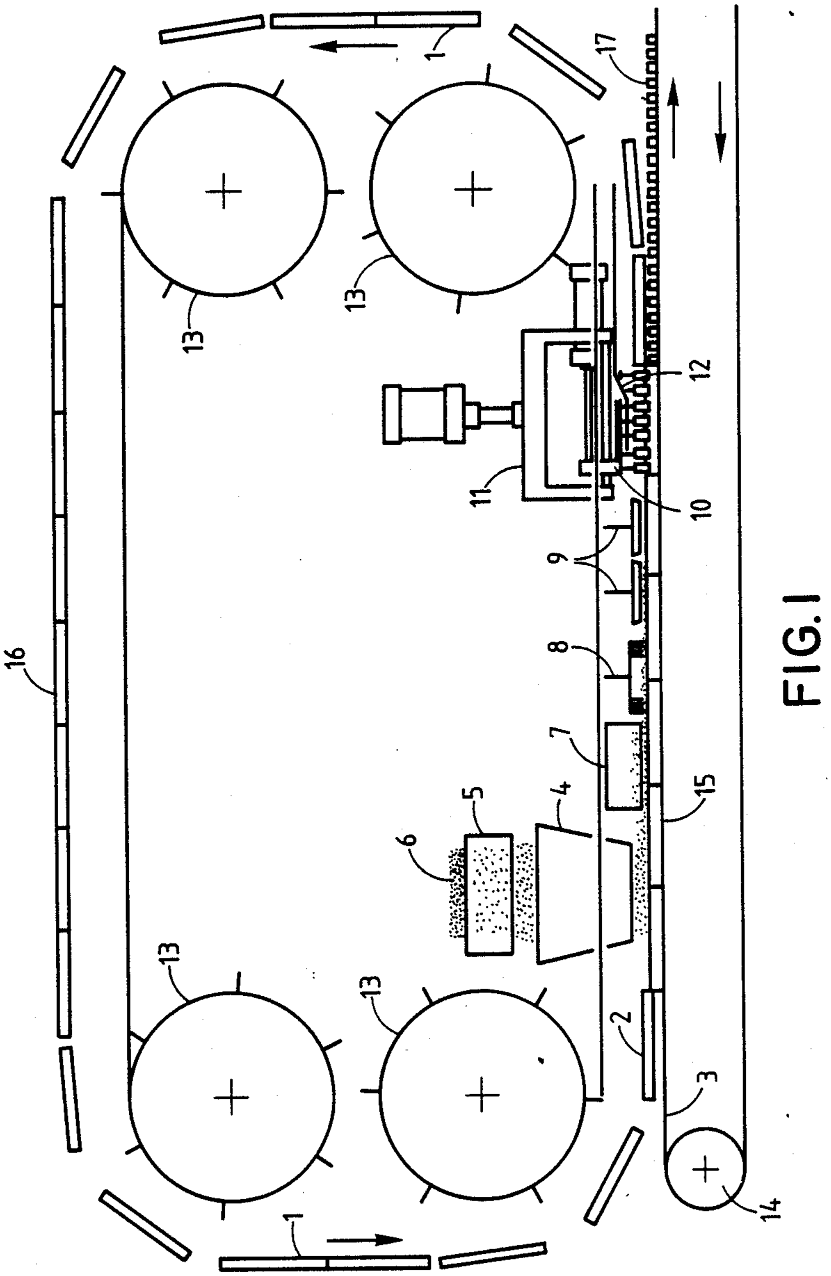
FIG. 1 is a general diagrammatic side elevation of one embodiment of the apparatus.

The embodiment of the apparatus shown in FIG. 1 comprises an endless shaping belt 1 formed by juxtaposed apertured plates 2, an endless conveyor belt 3 beneath the shaping belt 1 and forming cells with the apertures in said plates 2, means 4,5 for feeding the cells, a distributing and equalizing unit 7–9 and a tamping and ejection unit 10–12.

The endless shaping belt 1 forms an oval loop defined by four pairs of drive wheels 13 of which at least one is driven by a motor (not shown) synchronized in its rotational speed with a drive means (not shown) of a drive roller 14 of the endless conveyor belt 3. The oval loop formed by the shaping belt has a lower flat part 15 along which the apertured plates 2 pass successively beneath the feed means 4,5, beneath the distributing and equalizing unit 7–9 and then beneath and through the tamping and ejection unit 10–12. The oval loop also has an upper flat part 16 along which the apertured plates 2 return to their starting position upstream of the feed means.

The endless conveyor belt 3 travels at the same speed and in the same direction as the shaping belt 1 along the lower flat part 15 of the loop. This endless conveyor belt 3 extends beyond the downstream end of the lower flat part 15 of the loop so that the individual articles 17 which have been shaped directly thereon can be transported without any impact or drop out of the apparatus and then, for example, through a drying apparatus.

The means for feeding the cells comprises an endless transverse conveyor belt 5 ending above a hopper 4 into which it delivers a mass of particulate product 6 to be formed. The hopper 4 is arranged above the shaping belt 1 at the upstream end of the lower flat part 15 of the loop.

The distributing and equalizing unit comprises a distributing island 7 in the form (as seen from above) of a triangle of which the apex faces upstream, rotary brushes 8 and rotary smoothing discs 9. The brushes 8, of which there are two, are arranged beside one another downstream of the island 7. The smoothing discs 9, of which there are three, are arranged in a row of one overlapping a row of two covering the entire width of the shaping belt.

The tamping and ejection unit comprises an ejector 10, a vertical and horizontal-return drive mechanism 11 for the ejector and a vertical drive guide 12. This unit is designed to be able to impart relative movements to the apertured plates 2 and to the ejector 10 so that the individual articles 17 always remain on the apron 3 throughout the packing and ejection operations.

Figure 3:
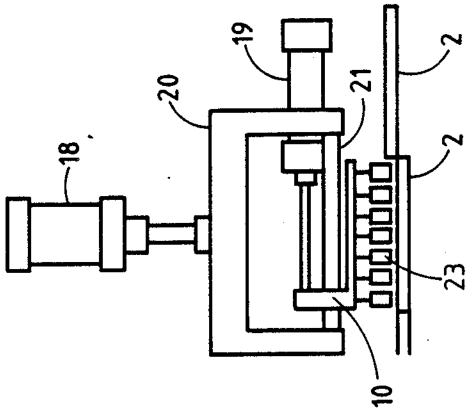
FIG. 3 is a diagrammatic side elevation of the vertical and horizontal-return drive mechanism of the ejector of the apparatus shown in FIG. 1.
Figure 2:
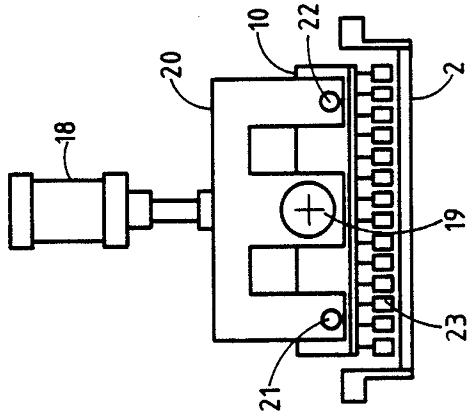
FIG. 2 is a diagrammatic front view of the vertical and horizontal-return drive mechanism of the ejector of the apparatus shown in FIG. 1.

As shown in FIGS. 2 and 3, the vertical and horizontal-return drive mechanism of the ejector 10 comprises a vertical pneumatic motor 18 and a horizontal pneumatic motor 19.

The horizontal pneumatic motor 19 and a pair of horizontal shafts 21, 22 are integral with a vertically displaceable frame 20 driven by the vertical pneumatic motor 18. The horizontal pneumatic motor 19 is intended to return or push the ejector 10 sliding on the horizontal shafts 21, 22 back into its waiting position.

The vertical pneumatic motor 18 is integral with a chassis (not shown) of the apparatus. This vertical pneumatic motor 18 is intended to make the ejector 10, of which the vertical pistons 23 are adapted to and are able to penetrate into the apertures of the apertured plates 2, descend and reascend.

Figure 4:
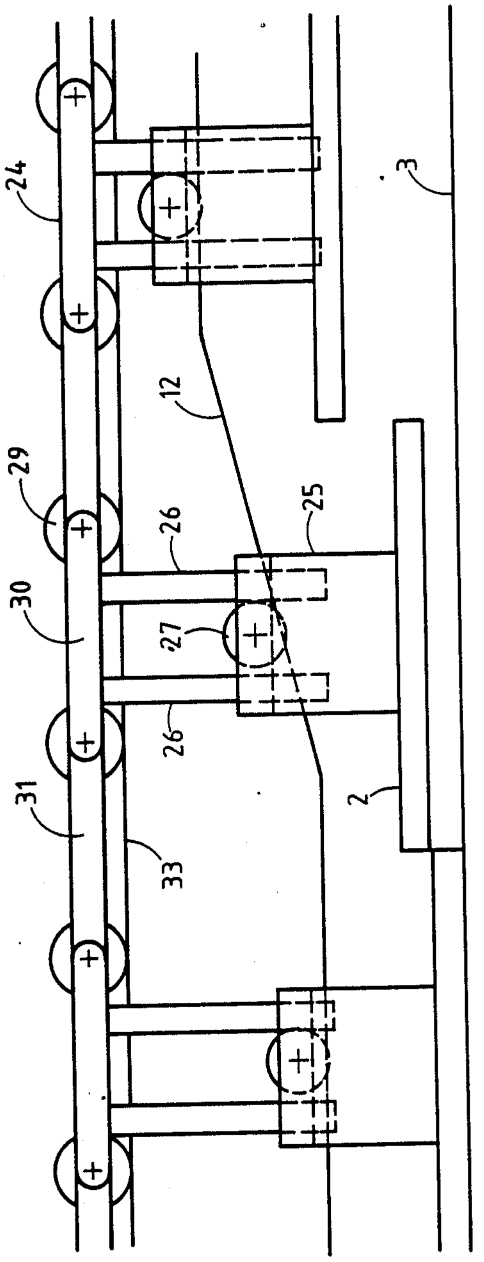
FIG. 4 is a side elevation of part of the tamping and ejection unit of the apparatus shown in FIG. 1.
Figure 5:
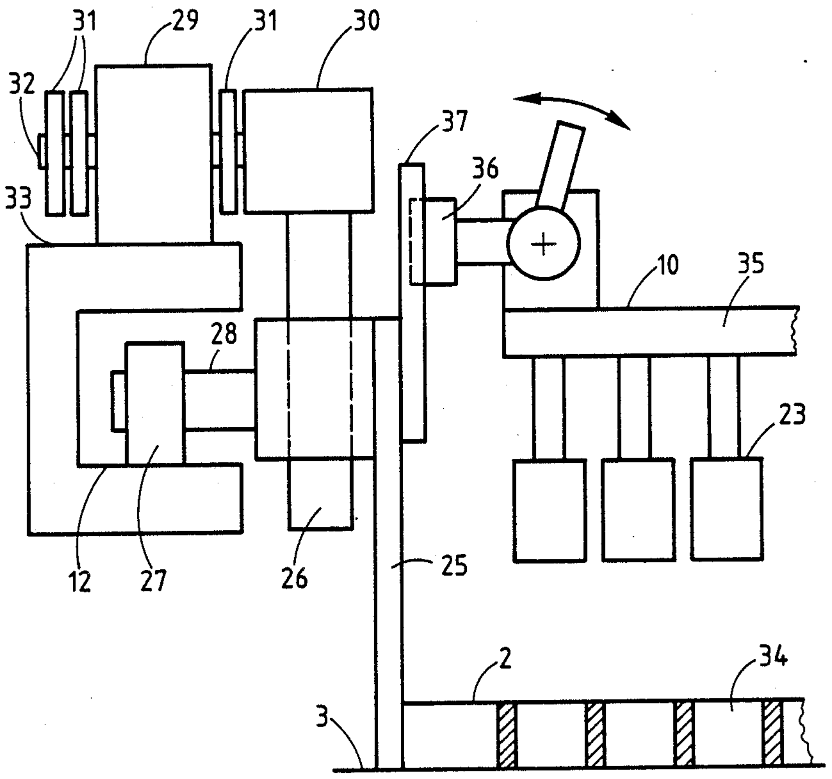
FIG. 5 is a rear view, partly in section, of another part of the tamping and ejection unit of the apparatus shown in FIG. 1.

As shown in FIGS. 4 and 5, the apertured plates 2, made in this case in the form of grids of the square-mesh grating type, are connected to drive chains 24 by drive supports 25 sliding on vertical drive shafts 26 fixed to the chains 24. Each plate 2 has one support at each of its two lateral ends and to each side of the shaping belt there corresponds a drive chain 24. Each drive chain 24 comprises chain rollers 29, links 30 carrying vertical drive shafts 26 and standard links 31 fixed to the axles 32 of the chain rollers 29.

Vertical drive rollers 27 are mounted on transverse axles 28 integral with the drive supports 25. The vertical drive guide 12 is made in the form of inclined planes situated on either side of the shaping belt. The plates 2 are thus able to ascend under the effect of the vertical drive rollers 27 which engage with the vertical drive guide 12 without their horizontal movement being affected in any way. This is because the chain rollers 29 continue to run along a horizontal chain guide 33 when the supports 25 ascend, sliding on the vertical drive shafts 26.

The ejector 10 comprises vertical pistons having a square horizontal section adapted to the square apertures of the plates or grids 2. The pistons 23 are thus able to penetrate into the cells 34 formed by the apron-/endless conveyor belt 3 fastened beneath the plates or grids 2. The ejector comprises as many vertical pistons 23 as there are apertures or openings in each plate or grid 2. The pistons 23 are integral with a hood 35 which slides on the vertically displaceable horizontal shafts 21,22 shown in FIGS. 2 and 3. The hood 35 additionally comprises a pivotal, horizontal-forward drive arm 36 intended to cooperate with horizontal-forward drive fingers 37 integral with the drive supports 25. The pivoting movements of this arm 36 between the engaged and disengaged positions, namely between the positions of cooperation or non-cooperation with the fingers 37, are imparted by a pneumatic motor (not shown).

Figures 6A, 6B, 6C, 6D:
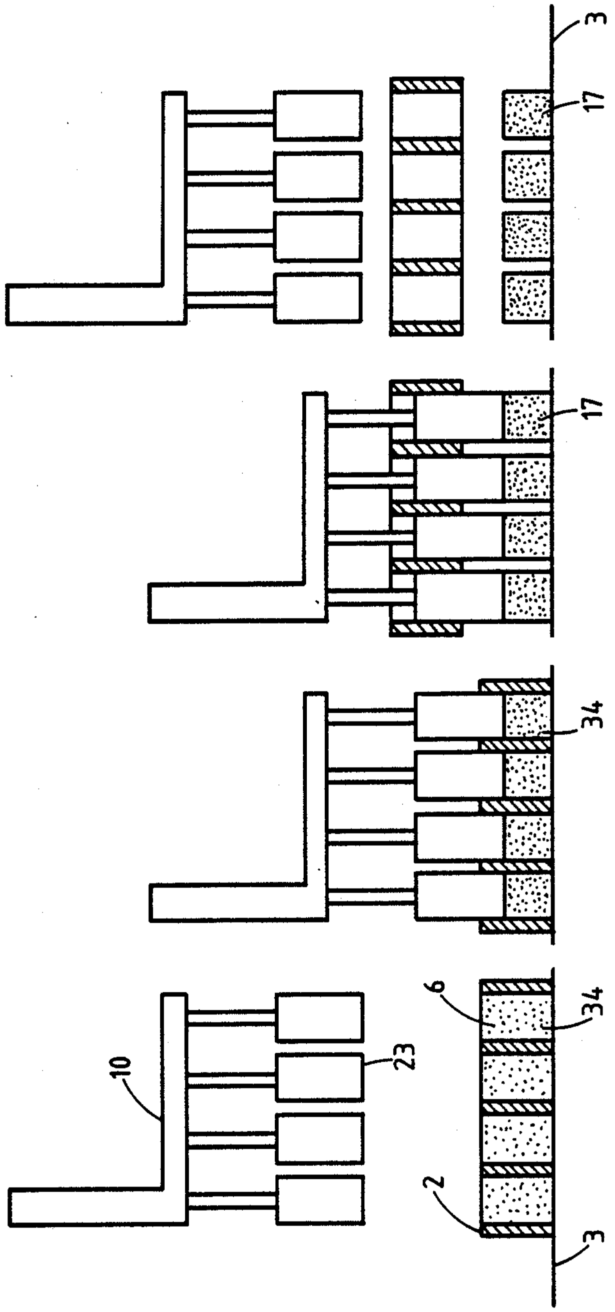
FIG. 6 diagrammatically illustrates the principle of the relative movements of the shaping plates and the ejector of the apparatus.

As shown in FIG. 6, the relative movements of the shaping plates 2 and the ejector 10 may be divided up into three main phases which are illustrated through the four relative positions A–D. In position A, the ejector 10 is in its waiting position above the shaping belt at the precise moment when the drive finger integral with the drive support of the plate 2 enters into cooperation or contact with the pivotal drive arm integral with the hood of the ejector 10.

In a first phase, from position A to position B, the ejector 10 descends and compresses the particulate product 6 in the cells 34 by partial penetration of the pistons 23 into the cells.

In a second phase, from position B to position C, the plate 2 ascends and disengages from the individual articles 17 while they are held on the apron/conveyor belt 3 by the pistons 23 which have remained in their lower position.

In a third phase, from position C to position D and back to position A, the ejector 10 in turn ascends, disengages from the plate 2 and is returned to its starting or waiting position in which it will be entrained by the drive finger integral with the drive support of the following shaping plate. The shaped individual articles 17 thus released from the cells without the slightest impact are carried out of the apparatus by the endless conveyor belt which, hitherto, has served as the apron 3.

The various movements imparted by the various drive means described with reference to FIGS. 1 to 6 are controlled and synchronized by pneumatic switches arranged at certain distances along the tamping and ejection unit 10–12 and actuated by the movements of the ejector 10 and the supports 25 of the shaping plates 2.

We claim:

1. An apparatus for shaping particulate material into individual agglomerated articles comprising:
  - an endless belt conveyor;
  - an endless chain conveyor for transporting a plate assembly having a plurality of juxtaposed shaping plates containing apertures therethrough, the plate assembly having plate drive shafts affixed to the chain conveyor, plate drive supports affixed to the forming plates and slidably mounted to the drive shafts, drive fingers affixed to the drive supports and drive rollers integral with the drive supports, the drive rollers having a longitudinal roller axis transverse to a longitudinal axis of the drive supports and being positioned with respect to the drive supports for, upon contact with a surface, effecting movement of the plates with respect to the plate drive shafts by reason of slidable movement of the drive supports on the drive shafts, the chain conveyor and plate assembly being positioned with respect to the belt conveyor such that a horizontal lower run of the chain conveyor and plate assembly is positioned above and in alignment with a portion of a horizontal upper run of the belt conveyor such that a lower surface of the apertured plates abuts the portion of the upper run of the belt conveyor for forming, by reason of the plate apertures and belt conveyor surface, article shaping cells;
  - means positioned above the horizontal lower run of the plates of the plate assembly for filling the cells with particulate material to be shaped into articles;
  - a movable article ejector unit positioned above the lower horizontal run of the plates downstream of the feeding means having pistons corresponding in number, arrangement and shape with a number, arrangement and shape of the apertures of the plates and thereby being adapted for insertion in the plate apertures, having a hood integral with the pistons which is slidably mounted on at least one horizontally oriented and vertically displaceable shaft for moving the pistons vertically and having an ejector unit drive arm for being contacted by the plate drive fingers for providing downstream movement of the ejector unit;
  - a plate assembly drive guide positioned along the lower horizontal run of the plate assembly for contacting the drive rollers and being inclined vertically upwards at a position adjacent the ejector unit for effecting vertical upwards movement of the apertured plates as the plates and ejector unit move downstream from an upstream position; and
  - an ejector unit vertical drive mechanism and horizontal-return return drive mechanism for enabling, by means of vertical movement of the pistons in the apertures of the plates, tamping material in the cells prior to the plates ascending, maintaining the material on the belt conveyor while the plates ascend, ejecting the material from the apertures of ascended plates, disengaging the pistons from the apertured plates from which the material has been ejected and returning the ejector unit to the upstream position upon disengagement of the ejector unit from the plate assembly.

2. An apparatus according to claim 1 further comprising a unit positioned between the feeding means and the ejector unit for distributing and equalizing the particulate material about the cells.

3. An apparatus according to claim 1 wherein the distributing and equalizing unit first includes a distributing island and then includes rotary brushes and smoothing discs.

4. An apparatus according to claim 1 wherein the chain conveyor is connected with and transported on rollers positioned on a guide.

5. An apparatus according to claim 1 wherein the plates contain apertures separated by walls in the form of grids.

* * * * *

UNITED STATES PATENT AND TRADEMARK OFFICE
CERTIFICATE OF CORRECTION

PATENT NO. : 4,936,200

DATED : June 26, 1990

INVENTOR(S) : Marcel Buhler, et al.

It is certified that error appears in the above-identified patent and that said Letters Patent is hereby corrected as shown below:

Column 3, line 45, after "drawings" delete the comma and insert a period.

Column 6, line 54 (claim 1, line 54) after "horizontal-return" delete "return".

Signed and Sealed this

Twenty-first Day of May, 1991

*Attest:*

HARRY F. MANBECK, JR.

*Attesting Officer*

*Commissioner of Patents and Trademarks*